United States Patent

[11] 3,545,344

[72] Inventors Walter Fuchs
 Bad Homburg, Vonder Hohe,
 Erich Runge, Frankfurt, am Main, Juan
 Belart and Gert Schrader, Walldorf, Hessen,
 Germany
[21] Appl. No. 708,955
[22] Filed Feb. 28, 1968
[45] Patented Dec. 8, 1970
[73] Assignee Alfred Teves GmbH
 Frankfurt am Main, Germany
 a corporation of Germany
[32] Priority March 1, 1967
[33] Germany
[31] No. T33318

[54] WHEEL-BRAKE CYLINDER OR THE LIKE
 6 Claims, 3 Drawing Figs.
[52] U.S. Cl.............................................. 92/165,
 92/75; 277/57
[51] Int. Cl................................................ F16j 11/04,
 F16j 15/44
[50] Field of Search........................................ 92/165,
 168, 75; 74/18.2; 188/152.81, 152.82;
 60/54.6(M); 277/56, 57

[56] References Cited
 UNITED STATES PATENTS
1,681,579  8/1928  Farmer........................ 92/165X
1,991,077  2/1935  Brittain........................ 277/56
2,018,754 10/1935  White........................... 188/79.5
2,083,686  6/1937  Campbell..................... 92/168X
2,234,574  3/1941  Olcott.......................... 277/57
2,313,431  3/1943  Goepfrich.................... 188/152X
2,405,093  7/1946  La Brie........................ 92/168X
2,629,463  2/1953  Freeman...................... 60/54.6X
2,712,367  7/1955  Schnell........................ 188/152X
2,733,780  2/1956  Myers.......................... 60/54.6X
2,740,647  4/1956  Van Pelt....................... 277/56X
3,127,181  3/1964  Crego et al. ................. 277/57X
3,144,280  8/1964  Sorenson...................... 277/57X
3,177,984  4/1965  Taylor.......................... 92/168
3,336,842  8/1967  Adelt.

Primary Examiner—Martin P. Schwadron
Assistant Examiner—Leslie J. Payne
Attorney—Karl F. Ross ABSTRACT: A hydraulic cylinder whose piston is coupled with a rod via a link member, especially a wheel-brake cylinder for internal-expansion or drum-type brakes, in which a pressure link is received in a socket in the end of the piston turned toward the open end of the cylinder, comprising a metallic dust-excluding cap closing this end of the cylinder and engaging the outer periphery thereof while being axially shiftable relatively to the cylinder jointly with the piston and having a craterlike inwardly extending portion held in the socket of the piston by the pressure member.

PATENTED DEC 8 1970

3,545,344

INVENTORS
WALTER FUCHS
ERICH RUNGE
JUAN BELART
GERT SCHRADER

BY

*Karl F. Ross*

ATTORNEY

WHEEL-BRAKE CYLINDER OR THE LIKE

Our present invention relates to a hydraulic cylinder construction and, more particularly, to improvements in wheel brake cylinders for automotive vehicle internal-expansion or drum-type brakes.

It will be generally recognized that the hydraulic brake systems of automotive vehicles are merely special cases of hydraulic networks provided for the remote actuation of a rod under the control of a master hydraulic cylinder. The master cylinder, e.g. the brake pedal operated cylinder of an automotive vehicle, is connected to one or more "slave" or follower cylinders whose pistons, in turn, are operatively connected with the load, via suitable hydraulic transmission lines. In an automotive brake system, the load is a brake shoe which is mounted upon a nonrotatable portion of the vehicle, e.g. a brake yoke or shield attached to the axial housing, which is displaceable against a rotating surface connected with a vehicle wheel. Two broad types of wheel brakes may be considered, these types being designated respectively as disk brakes and drum brakes. While the present invention is described mainly in connection with the latter type of brake, it will be apparent that it may be equally applicable to the former and indeed to all systems in which the follower piston is connected to a load via a pressure transmitting member or rod.

In a drum-type or internal-expansion brake, a wheel brake cylinder is mounted upon the brake shield and has one or two pistons which apply force outwardly to urge respective brakeshoes against the inner cylindrical surface of a drum. The brakeshoes, which conform to cylindrical segments, are juxtaposed with the drum at angularly spaced locations about the axis of rotation of the drum and are generally pivoted at one end of the brakeshoe to the brake shield or a floating, force multiplying linkage connected in turn to the shield. At the other end of the brakeshoe, the respective wheel brake cylinder and piston deliver braking force via a pressure transmitting member or rod. The overall construction of a wheel brake of this type is described in "Principles of Automotive Vehicles", U.S. Government Printing Office, Washington D.C. 1956. The brakeshoe generally has an arcuate backing plate, carrying a brake lining and reinforced by a spine or web extending perpendicularly to the backing plate and parallel to the brake shield upon which the cylinder is mounted. The pressure transmitting rod can thus have a notch receiving the spine to enable positive delivery of the actuating force to the brakeshoe.

In such systems, the hydraulic cylinder has as open end at which the forward face of the piston is exposed and through which the pressure transmitting rod extends. The forward face of the piston is commonly provided with a recess or socket having generally spheroidal bearing surfaces in which the complementarily shaped end of the pressure transmitting rod is received with some degree of swivel ability. The relative mobility of the rod and the piston is of advantage to permit thermal distortion changes of the various parts, to ensure displacement of the piston and rod without binding, and to permit at least some movement of the brakeshoes along with the disk as part of a self-tightening or force multiplying action. To prevent the passage of dust, moisture and other particulate contaminants into the wheel brake cylinder, it has been the practice to provide the latter, apart from the seals between the piston and the cylinder wall, with a dust or contamination excluding cap of elastomeric material and of annular (i.e. ring-shaped) construction, the outer periphery of this cap being seated in a groove along the outer periphery of the cylinder, while the inner periphery engages the piston or the rod which, in either case, passes through the cap. The latter is composed of a rubberlike web which must flex or roll to permit movement of the force transmitting rod during brake operation. The movement, however, leads to stretching of the cap and eventually to a relaxation in the tightness with which the cap hugs the cylinder or rod. In addition, the friction of the aforementioned movements, the elevated temperature generated upon brake application and, frequently, the presence of oil and other contaminating materials in the region of the wheel brake cylinder combine to cause early deterioration of the cap and, upon such deterioration, the penetration of contaminants into the wheel brake cylinder.

It is, therefore, the principal object of the present invention to provide an improved wheel brake cylinder construction and dust cap assembly whereby the aforementioned disadvantages can be obviated and the penetration of liquid and dirt between the cylinder and the piston is precluded.

Another object of this invention is to provide an improved closure arrangement for an open end of a hydraulic cylinder whereby the effective temperature, oil and other contaminants, and relative movement of the several parts will not cause early deterioration of the seal.

We have found that it is possible to overcome completely all of the aforementioned disadvantages by providing, in a cylinder arrangement of the character described, a metallic dust excluding cap which is generally cup shaped and has a mouth of substantially cylindrical configuration which fits slidably over the open end of the wheel brake cylinder and is axially shiftable relatively thereto, the cap being made of drawn or spun metal without any perforation through which the rod may pass. Centrally of the cylindrical mouth of this cup, we form a craterlike protuberance which extends axially into the cylinder beyond the axial limit of the cylindrical mouth and is complementarily received in the socket of the piston, being held thereagainst by the correspondingly shaped pressure transmitting rod.

The above and other objects, features and advantages of the present invention will become more readily apparent from the following description, reference being made to the accompanying drawing in which.

Figure 1:
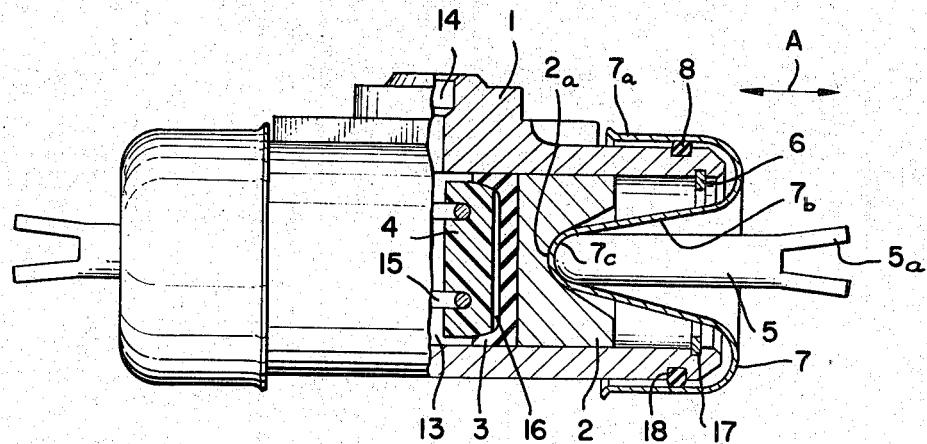
FIG. 1 is a partial axially cross-sectional view of a wheel brake cylinder in accordance with the present invention.

In FIG. 1, we show a wheel brake cylinder for an internal-expansion brake, e.g. of the type described in the aforementioned publication, which comprises a cylinder housing 1 open at its opposite ends and receiving a pair of pistons one of which may be seen in section at 2. In FIG. 1 and in FIGS. 2 and 3, only a single piston assembly is shown although it will be understood that the other piston is symmetrically disposed on the other side of the cylinder. Between the pistons, the cylinder bore is formed with a working chamber 13 to which brake fluid is supplied from an inlet port 14. The cylinder 1 is sealed relative to the working chamber 13 by a rubber sealing cup 3 whose concavity, turned toward chamber 13, is filled with a block 4 against which a coil spring 15 bears so that the block 4 defines with the sealing cup 3, an air reservoir 16. The stroke of the piston 2 is limited, at the open side of cylinder 1, by a split ring 6 retained by its inherent resiliency in a groove 17.

In an outer peripheral groove 18 adjacent the open end of the cylinder, a sealing ring 8 is seated for slidable engagement with a cylindrical apron 7a of a sheet metal dust cap 7. The dust cap is formed centrally with a craterlike protuberance 7b frustoconically converging inwardly along the axis of the cylinder and terminating beyond the apron 7a in a generally spheroidal seat 7c complementarily to the seat 2a of the piston 2. The seat 2a diverges frustoconically from its spherical portion with an apex angle exceeding that of the frustoconical portion of the protuberance 7b. The sheet metal dust cap 7, which can be drawn or spun from a metal disk and is unperforated, receives the force transmitting rod 5 whose spherical end is complementary to the spherical portion 7c of the dust cap. Rod 5 has a split end 5a which engages the spine of the corresponding brakeshoe and retains the dust cap 7 in the socket 2a. The dust cap 7 is axially shiftable (arrow A) with the piston 2 and the rod 5 to prevent entry of the dirt, dust and other contaminants (e.g. moisture), into the cylinder. The rounded head of the rod 5 is tightly hugged by the spherical portion 7c of the cap, thereby ensuring a rigid connection of the three elements 2, 5, and 7. The seal 8 slidably engages the inner wall of the apron 7a to further ensure a satisfactory seal.

Figure 2:
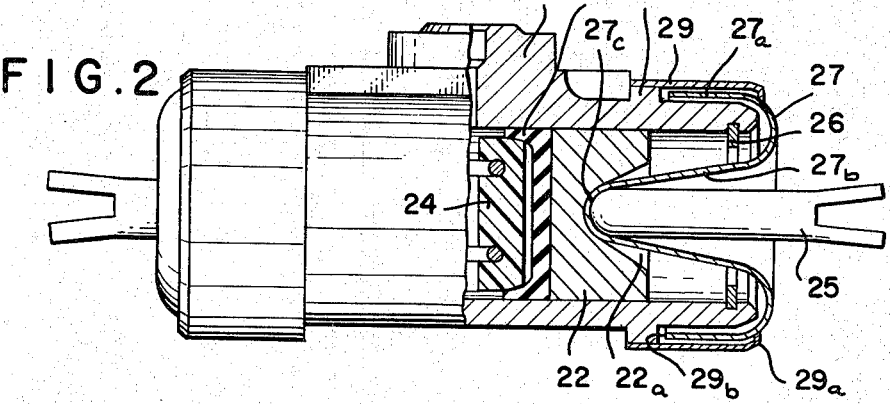
FIG. 2 is a similar cross-sectional view illustrating another embodiment thereof.

In the system of FIG. 2, the cylinder 21 cooperates with a piston 22 whose cup 23 and filler body 24 have been previously described. In this embodiment, however, instead of the seal 8, a labyrinth arrangement is provided by a sheet metal shell 29 which is force-fitted to a boss 21' formed peripherally on the cylinder 21 at a location axially inwardly of the mouth. The split ring 26 forms a stop of the piston 22. The shell 29 has a inwardly turned lip 29a and defines with the periphery of the cylinder 21, and axially extending annular compartment 29b into which the cylindrical apron 27a of the sheet metal dust cap 27 extends. In this embodiment as well, the frustoconical protuberance 27b terminates in a spherical socket 27c for the rounded end of the pressure transmitting rod 25 and is held by this rod in the socket 22a in the forward end of the piston 2. The labyrinth seal permits axial displacement of the dust cap without slidable engagement of a sealing ring therewith.

Figure 3:
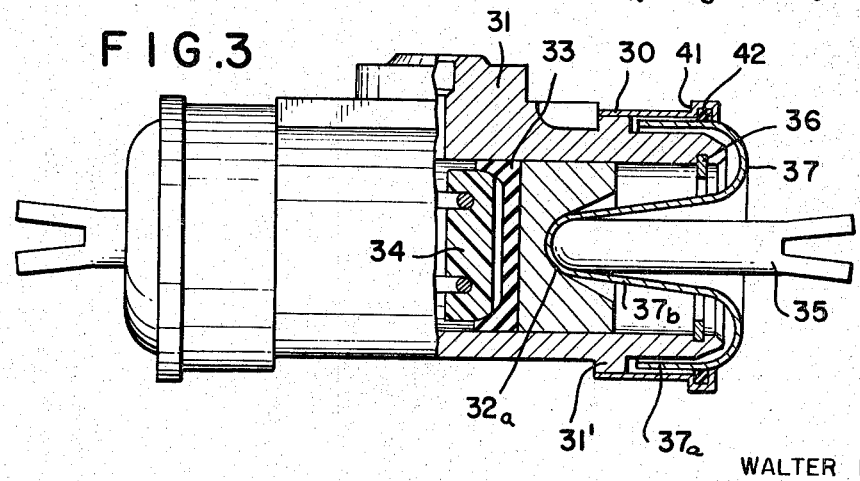
FIG. 3 is a partial axially cross-sectional view of still another wheel brake cylinder.

In the modification of FIG. 3, the cylindrical seal 30, mounted upon a shoulder 31' of the cylinder 31 is formed close to the mouth of the cylinder with an annular groove 41 bent integrally from the sheet metal and receiving a circular cross section sealing ring 42 (i.e. an O-ring) which bears upon the outer periphery of the cylindrical apron 27a of the sheet metal dust cap 37. In this embodiment as well, the protuberance 37b of the apron is retained in the socket 32a of the piston 32 by the pressure transmitting rod 35 while the piston has a sealing cup 33 against which the filler body 34 acts. The split ring 36 limits the stroke of piston 32.

We claim:
1. A wheel brake cylinder of an automotive vehicle brake system assembly adapted to receive a hydraulic fluid and capable of operating a brakeshoe of said system, comprising:
   housing means forming a cylinder open at one end;
   a piston axially shiftable in said cylinder and formed with a rounded socket facing in the direction of said end;
   a sheet metal dust cap axially shiftable relatively to said cylinder and substantially closing said end of said cylinder, said dust cap having an inwardly converging frustoconical protuberance extending within said cylinder and complementarily received in said socket, and a generally cylindrical apron surrounding said housing means in the region of the open end of said cylinder and constituting one piece with said protuberance;
   a pressure transmitting rod having a generally spherically rounded extremity received in said protuberance for retaining same in said socket, retaining said cap against said piston and operatively connected with said brakeshoe; and
   sealing means on said housing means in the region of said open end and cooperating with said apron to restrict entry of contaminants into said cylinder through said open end.
2. The assembly defined in claim 1 wherein said sealing means includes an annular seal slidably engaging said apron.
3. A wheel brake cylinder of an automotive vehicle brake system assembly adapted to receive a hydraulic fluid and capable of operating a brakeshoe of said system, comprising:
   housing means forming a cylinder open at one end;
   a piston axially shiftable in said cylinder and formed with a rounded socket facing in the direction of said end;
   a sheet metal dust cap axially shiftable relatively to said cylinder and substantially closing said end of said cylinder, said dust cap having an inwardly converging frustoconical protuberance extending within said cylinder and complementarily received in said socket, and a generally cylindrical apron surrounding said housing means in the region of the open end of said cylinder and constituting one piece with said protuberance;
   a pressure transmitting rod having a generally spherically rounded extremity received in said protuberance for retaining same in said socket, retaining said cap against said piston and operatively connected with said brakeshoe; and
   sealing means on said housing means in the region of said open end and cooperating with said apron to restrict entry of contaminants into said cylinder through said open end, said sealing means including an annular seal slidably engaging the outer periphery of said apron.
4. A wheel brake cylinder of an automotive vehicle brake system assembly adapted to receive a hydraulic fluid and capable of operating a brakeshoe of said system, comprising:
   housing means forming a cylinder open at one end;
   a piston axially shiftable in said cylinder and formed with a rounded socket facing in the direction of said end;
   a sheet metal dust cap axially shiftable relatively to said cylinder and substantially closing said end of said cylinder, said dust cap having an inwardly converging frustoconical protuberance extending within said cylinder and complementarily received in said socket, and a generally cylindrical apron surrounding said housing means in the region of the open end of said cylinder and constituting one piece with said protuberance;
   a pressure transmitting rod having a generally spherically rounded extremity received in said protuberance for retaining same in said socket, retaining said cap against said piston and operatively connected with said brakeshoe; and
   sealing means on said housing means in the region of said open end and cooperating with said apron to restrict entry of contaminants into said cylinder through said open end, said sealing means including a cylindrical shell mounted upon said housing means and surrounding said apron while defining therewith a labyrinth-type seal.
5. The assembly defined in claim 4, further comprising a sealing ring mounted on said shell and slidably engaging said apron.
6. The assembly defined in claim 5, wherein said seal engages the inner periphery of said apron.